United States Patent
Wang

(10) Patent No.: US 8,459,115 B2
(45) Date of Patent: Jun. 11, 2013

(54) MEMS ACCELEROMETER WITH ENHANCED STRUCTURAL STRENGTH

(75) Inventor: Chuan-Wei Wang, Taoyuan (TW)

(73) Assignee: Pixart Imaging Incorporation, R.O.C., Hsin-Chu (TW)

(*) Notice: Subject to any disclaimer, the term of this patent is extended or adjusted under 35 U.S.C. 154(b) by 235 days.

(21) Appl. No.: 12/927,282

(22) Filed: Nov. 10, 2010

(65) Prior Publication Data

US 2012/0042729 A1 Feb. 23, 2012

(30) Foreign Application Priority Data

Aug. 17, 2010 (TW) ................................ 99127394 A

(51) Int. Cl.
*G01P 15/125* (2006.01)
(52) U.S. Cl.
USPC .......................................... 73/514.32; 73/510
(58) Field of Classification Search
USPC ............... 73/514.32, 514.36, 514.38, 514.24, 73/514.15, 510
See application file for complete search history.

(56) References Cited

U.S. PATENT DOCUMENTS

| | | | |
|---|---|---|---|
| 5,487,305 A * | 1/1996 | Ristic et al. ................ | 73/514.32 |
| 5,610,335 A | 3/1997 | Shaw et al. | |
| 5,914,553 A | 6/1999 | Adams et al. | |
| 6,223,598 B1 * | 5/2001 | Judy ........................... | 73/514.32 |
| 7,013,730 B2 * | 3/2006 | Malametz ................... | 73/514.36 |
| 7,258,012 B2 * | 8/2007 | Xie .............................. | 73/514.32 |
| 2003/0101817 A1 * | 6/2003 | Sakai .......................... | 73/514.32 |
| 2009/0256297 A1 | 10/2009 | Geisberger | |
| 2010/0024549 A1 * | 2/2010 | Wang et al. ................ | 73/504.14 |
| 2010/0116055 A1 * | 5/2010 | Lee et al. .................... | 73/514.32 |
| 2010/0242606 A1 * | 9/2010 | Kanemoto ................. | 73/514.38 |
| 2010/0288047 A1 * | 11/2010 | Takagi ....................... | 73/514.32 |

FOREIGN PATENT DOCUMENTS

WO   WO 2004/077073 A1   9/2004

* cited by examiner

*Primary Examiner* — Helen Kwok
(74) *Attorney, Agent, or Firm* — Tung & Associates

(57) ABSTRACT

The present invention discloses a MEMS (Micro-Electro-Mechanical System, MEMS) accelerator with enhanced structural strength. The MEMS accelerator is located on a substrate, and it includes: multiple springs, wherein each spring includes: an anchor, fixed on the substrate; an extensible part, which has a fixed end fixed on the anchor, and a free end floating above the substrate; a proof mass, connected to the free ends of the springs; and multiple in-plane sense electrodes, wherein the extensible part is folded back and forth to form a substantially polygon shape as a whole, in which the fixed end is located within the middle one third length of one side of the substantially polygon shape, and the free end is located within the middle one third length of an opposite side of the substantially polygon shape.

24 Claims, 13 Drawing Sheets

MEMS ACCELEROMETER WITH ENHANCED STRUCTURAL STRENGTH

BACKGROUND OF THE INVENTION

1. Field of Invention

The present invention relates to a MEMS accelerometer with enhanced structural strength.

2. Description of Related Art

Typical conventional MEMS accelerometers are in-plane (X-Y plane) or out-of-plane (Z axis) sensors that can only detect either X-Y plane speed changes or Z axis speed changes, but can not detect speed changes in three dimensions. Therefore, it is desired to provide a three dimensional MEMS accelerometer which can detect three dimensional speed changes.

Besides, in the packaging process of the MEMS accelerometer nowadays, the whole device will be subject to high temperature. Therefore, the device structure must be well designed to avoid local peeling, deformation, or other structural damages, such that it does not cause manufacturing yield loss or operation mistakes of the MEMS accelerometers.

In view of the foregoing, the present invention provides a MEMS accelerometer with enhanced structural strength.

SUMMARY OF THE INVENTION

The objective of the present invention is to provide a MEMS accelerometer with enhanced structural strength.

To achieve the objective mentioned above, from one perspective, the present invention provides a MEMS accelerometer with enhanced structural strength, comprising:
(1) multiple springs wherein each spring includes:
(1a) a spring anchor fixed on a substrate; and
(1b) an extensible part having:
(1b1) a fixed end fixed to the spring anchor; and
(1b2) a free end floating above the substrate;
wherein the extensible part is folded back and forth to form a substantially polygon shape as a whole, in which the fixed end is not located around a corner of the substantially polygon shape, and the free end is located within an opposite side of the substantially polygon shape and neither around a corner;
(2) a proof mass having multiple joints connected to corresponding free ends of the multiple springs respectively; and
(3) multiple in-plane sense electrodes wherein each in-plane sense electrode includes:
(3a) at least one stator fixed on the substrate, having:
(3a1) a stator anchor fixed on the substrate;
(3a2) multiple stator metal layers fixed to the stator anchor; and
(3a3) at least one stator connection plug for connecting adjacent layers of the stator metal layers; and
(3b) at least one rotor connected to the proof mass, having:
(3b1) multiple rotor metal layers connected to the proof mass; and
(3b2) at least one rotor connection plug for connecting adjacent layers of the rotor metal layers.

In the aforementioned MEMS accelerometer, preferably, each spring further includes a stabilizing sector connecting the free end to the proof mass, wherein the stabilizing sector is located on the same side with the free end and wider than the free end.

In the aforementioned MEMS accelerometer, preferably, a top one, a bottom one, or both top and bottom ones of the stator metal layers include multiple metal sectors which are not connected to one another at the same level but are connected to an adjacent stator metal layer by the at least one stator connection plug.

In the aforementioned MEMS accelerometer, preferably, a top one, a bottom one, or both top and bottom ones of the rotor metal layers include multiple metal sectors which are not connected to one another at the same level but are connected to an adjacent rotor metal layer by the at least one rotor connection plug.

From another perspective, the present invention provides a MEMS accelerometer with enhanced structural strength, comprising:
(1) multiple springs wherein each spring includes:
(1a) a spring anchor fixed on a substrate; and
(1b) an extensible part having:
(1b1) a fixed end fixed to the spring anchor; and
(1b2) a free end floating above the substrate;
(2) a proof mass having multiple joints connected to corresponding free ends of the multiple springs respectively; and
(3) multiple in-plane sense electrodes wherein each in-plane sense electrode includes:
(3a) at least one stator fixed on the substrate, having:
(3a1) a stator anchor fixed on the substrate;
(3a2) multiple stator metal layers fixed to the stator anchor; and
(3a3) at least one stator connection plug for connecting adjacent layers of the stator metal layers; and
(3b) at least one rotor connected to the proof mass, having:
(3b1) multiple rotor metal layers connected to the proof mass; and
(3b2) at least one rotor connection plug for connecting adjacent layers of the rotor metal layers;
wherein a top one, a bottom one, or both top and bottom ones of the rotor metal layers include multiple metal sectors which are not connected to one another at the same level but are connected to an adjacent rotor metal layer by the at least one rotor connection plug.

In the aforementioned MEMS accelerometer, preferably, a top one, a bottom one, or both top and bottom ones of the stator metal layers include multiple metal sectors which are not connected to one another at the same level but are connected to an adjacent stator metal layer by the at least one stator connection plug.

From another perspective, the present invention provides a MEMS accelerometer with enhanced structural strength, comprising:
(1) multiple springs wherein each spring includes:
(1a) a spring anchor fixed on a substrate; and
(1b) an extensible part having:
(1b1) a fixed end fixed to the spring anchor; and
(1b2) a free end floating above the substrate;
(2) a proof mass having multiple joints connected to corresponding free ends of the multiple springs respectively; and
(3) multiple in-plane sense electrodes wherein each in-plane sense electrode includes:
(3a) at least one stator fixed on the substrate, having:
(3a1) an stator anchor fixed on the substrate;
(3a2) multiple stator metal layers fixed to the stator anchor; and
(3a3) at least one stator connection plug for connecting adjacent layers of the stator metal layers; and
(3b) at least one rotor connected to the proof mass, having:
(3b1) multiple rotor metal layers connected to the proof mass; and
(3b2) at least one rotor connection plug for connecting adjacent layers of the rotor metal layers;

wherein a top one, a bottom one, or both top and bottom ones of the stator metal layers include multiple metal sectors which are not connected to one another at the same level but are connected to an adjacent stator metal layer by the at least one stator connection plug.

In the aforementioned MEMS accelerometer, preferably, the rotor includes a relatively wider enhancement beam and a relatively narrower electrode, for enhancing the structural strength of the rotor.

In the aforementioned MEMS accelerometer, preferably, the enhancement beam includes an "I" shape, an "II" shape, or a cross shape from top view.

The aforementioned MEMS accelerometer preferably further comprises an out-of-plane sense electrode, wherein the out-of-plane sense electrode includes: a Z-axis stator fixed on the substrate; and at least one Z-axis rotor connected to the proof mass, each Z-axis rotor having: multiple Z-axis rotor metal layers connected to the proof mass; and at least one Z-axis rotor connection plug for connecting adjacent layers of the Z-axis rotor metal layers.

In the aforementioned MEMS accelerometer, preferably, a top one, a bottom one, or both top and bottom ones of the Z-axis rotor metal layers include multiple metal sectors which are not connected to one another at the same level but are connected to an adjacent Z-axis rotor metal layer by the at least one Z-axis rotor connection plug.

In the aforementioned MEMS accelerometer, preferably, the Z-axis rotor includes extended metal sectors perpendicular to each other from top view.

In the aforementioned MEMS accelerometer, preferably, the stator has a substantially linear shape from top view, and the stator anchor is located at an end nearer to the proof mass.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, but not drawn according to actual scale.

Figure 1:
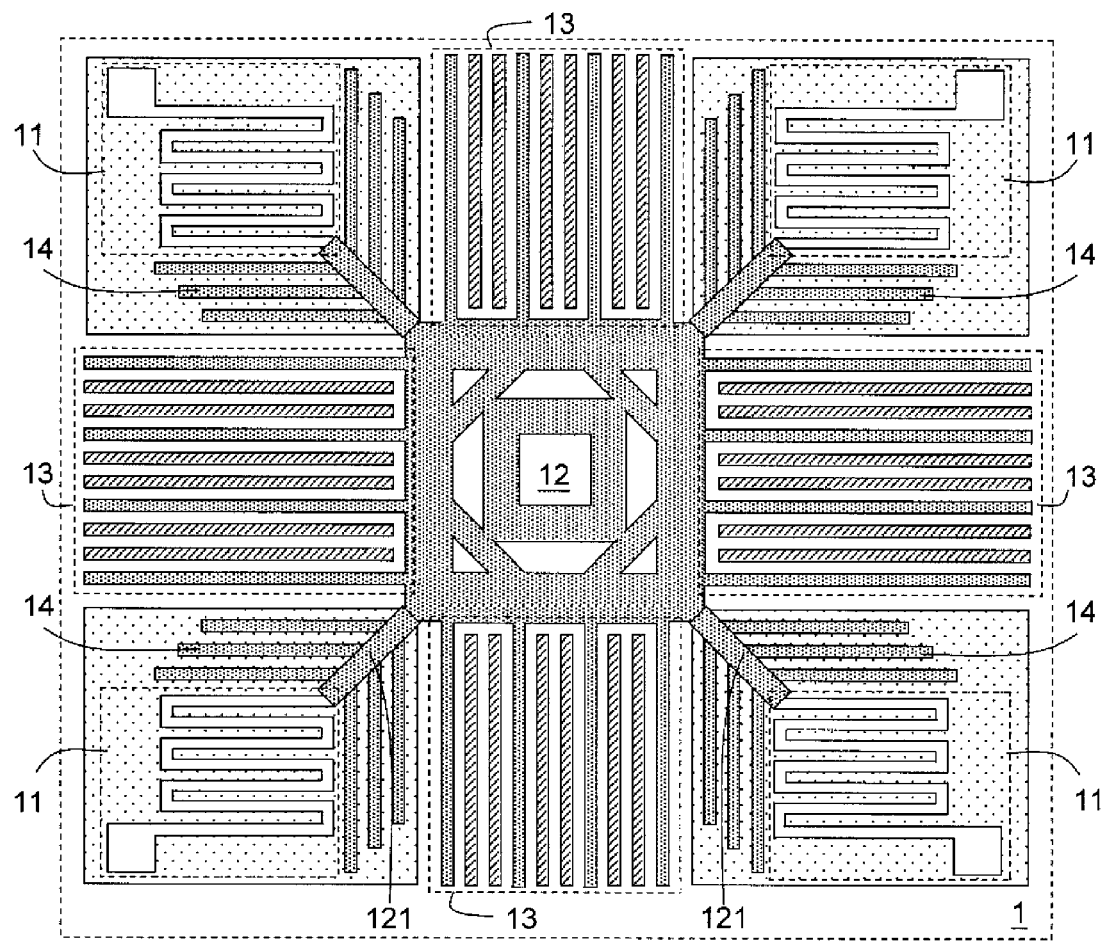
FIG. 1 is a schematic diagram showing a top view of a MEMS accelerometer.
Figures 2A, 2B:
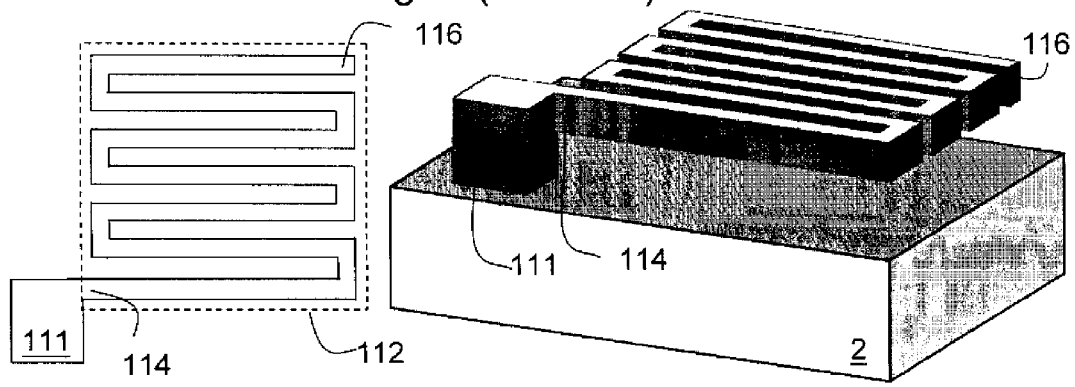
FIGS. 2A and 2B are schematic diagrams showing the structure of a spring 11.
Figure 3:
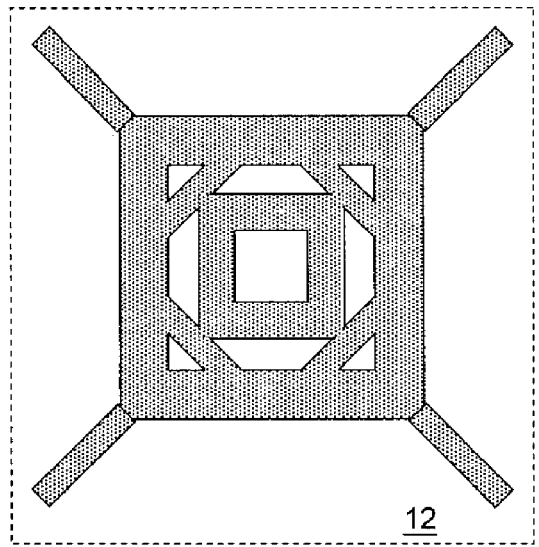
FIG. 3 is a schematic diagram showing a top view of a proof mass 12.

FIG. 1 shows the top view schematic diagram of a three-dimensional MEMS accelerometer 1. The MEMS accelerometer 1 includes a spring 11, a proof mass 12, in-plane sense electrodes 13, and out-of-plane sense electrodes 14. FIGS. 2A and 2B are schematic diagrams showing the structure of the spring 11, wherein each spring 11 includes a spring anchor 111 which is fixed on a substrate 2; and an extensible part 112 which is connected to the spring anchor 111. As shown in FIG. 2A, the extensible part 112 is folded back and forth to form a substantially polygon shape as a whole from the top view. The extensible part 112 has a fixed end 114 and a free end 116, wherein the fixed end 114 is fixed to the spring anchor 111; and the free end 116 is floating above the substrate 2. As shown in FIG. 1, the proof mass 12 has four joints 121 which are connected to the four free ends 16 of the four springs 11 respectively, such that the proof mass 12 can move in all directions in the space. The top view of the proof mass 12 is shown in FIG. 3. As shown in the figure, the proof mass 12 preferably includes openings to reduce the mass of the proof mass 12, and to facilitate etching materials below the proof mass 12 in the manufacturing process.

Figure 4A:
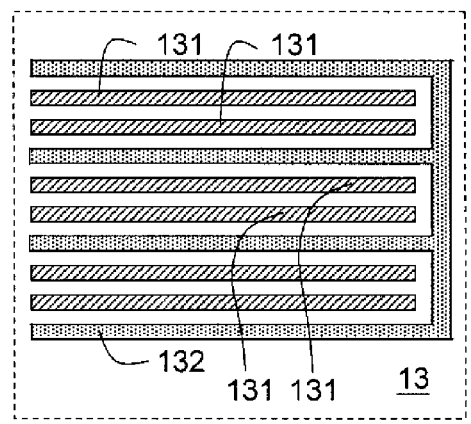
FIG. 4A shows a top view of an in-plane sense electrode 13.
Figure 4B:
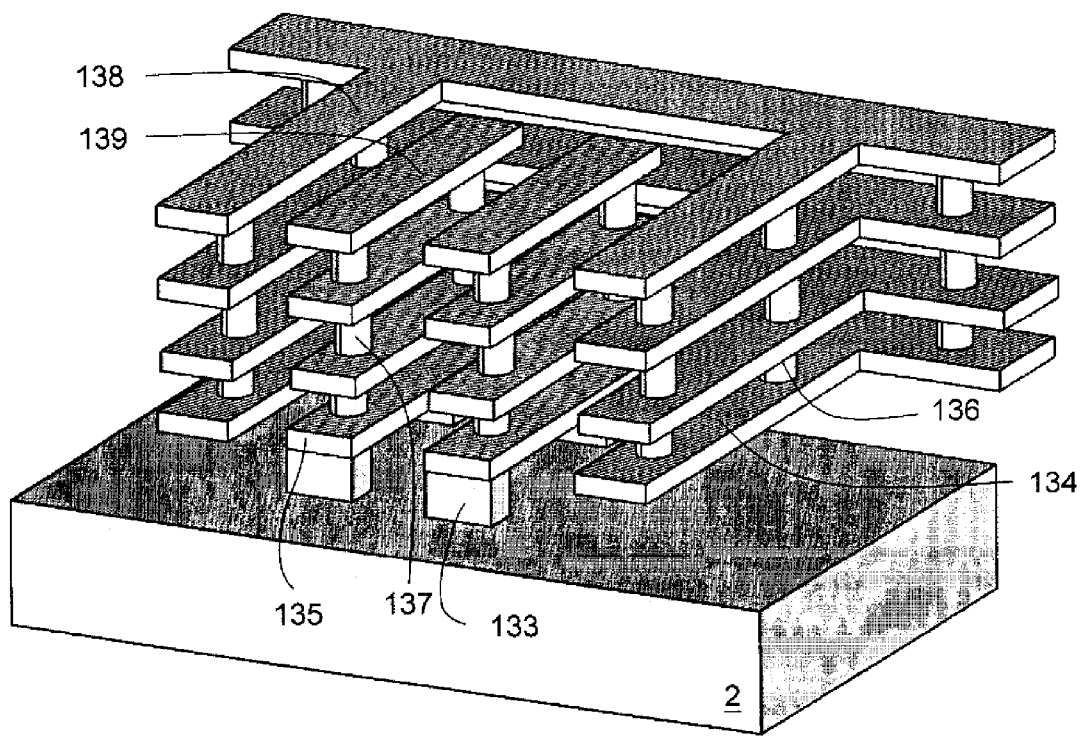
FIG. 4B shows a stereogram of the in-plane sense electrode 13.

FIG. 4A shows the top view of the in-plane sense electrode 13. Each in-plane sense electrode 13 includes multiple X-axis or Y-axis stators 131 and one X-axis or Y-axis rotor 132. Referring to FIG. 4B, each stator 131 has at least one stator anchor 133 which is fixed on the substrate 2, a bottom stator metal layer 135 which is connected to the stator anchor 133, multiple stator metal layers, and multiple stator connection plugs 137 connecting each stator metal layer with its adjacent layers till a top stator metal layer 139. The rotor 132 is connected to the proof mass 12 such that it moves along with the proof mass 12 in the space. When the movement of the proof mass 12 results in a change in the distance between the stator 131 and the rotor 132 in the x or y direction, the acceleration of the proof mass 12 in the x or y direction can be calculated by detecting the capacitance change between the stator 131 and the rotor 132. As shown in FIG. 4B, the rotor 132 includes a bottom rotor metal layer 134 which is connected to an upper rotor metal layer by multiple rotor connection plugs 136, and the upper rotor metal layer is connected to another metal layer further above, till a top rotor metal layer 138.

Figure 5A:
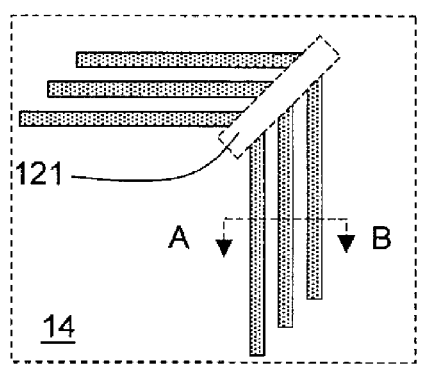
FIG. 5A shows a top view of an out-of-plane sense electrode 14.
Figure 5B:
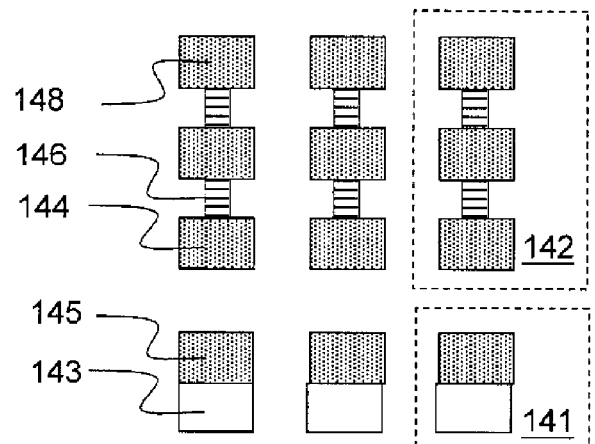
FIG. 5B is a cross-sectional view taken along the cross-section line A-B in FIG. 5A.
Figure 5C:
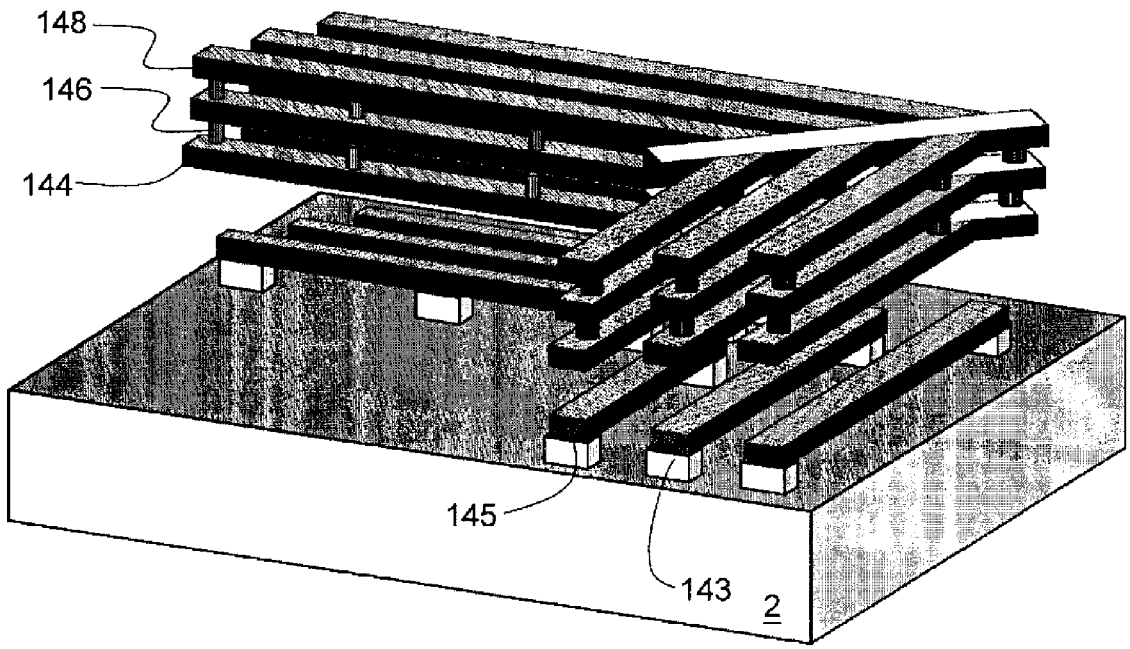
FIG. 5C shows a stereogram of the out-of-plane sense electrode 14.

FIG. 5A shows the top view of the out-of-plane sense electrode 14. The out-of-plane sense electrode 14 includes multiple Z-axis stators 141 and multiple Z-axis rotors 142. Referring to FIGS. 5B and 5C, FIG. 5B shows a cross-sectional view along the cross-section line AB shown in FIG. 5A. Each Z-axis stator 141 includes at least one stator anchor 143 which is fixed on the substrate 2, and a stator conductive layer 145 which is connected to the stator anchor 143, wherein the stator conductive layer 145 for example is a metal layer or a polysilicon layer. The z-axis rotor 142 is connected to a proof mass joint 121 such that the z-axis rotor 142 moves along with the proof mass 12. When the movement of the proof mass 12 results in a change in the distance between the z-axis stator 141 and the z-axis rotor 142 in the z direction, the acceleration of the proof mass 12 in the z direction can be calculated by detecting the capacitance change between the z-axis stator 141 and the z-axis rotor 142. As shown in FIGS. 5B and 5C, the z-axis rotor 142 includes a bottom z-axis rotor metal layer 144 which is connected to an upper z-axis rotor metal layer by multiple z-axis rotor connection plugs 146, and the upper z-axis rotor metal layer is connected to another metal layer further above, till a top z-axis rotor metal layer 148. In this embodiment, the stator conductive layer 145 is a layer above the substrate 2; however, the stator conductive layer 145 may alternatively be a doped area in the substrate 2.

Figure 6A:
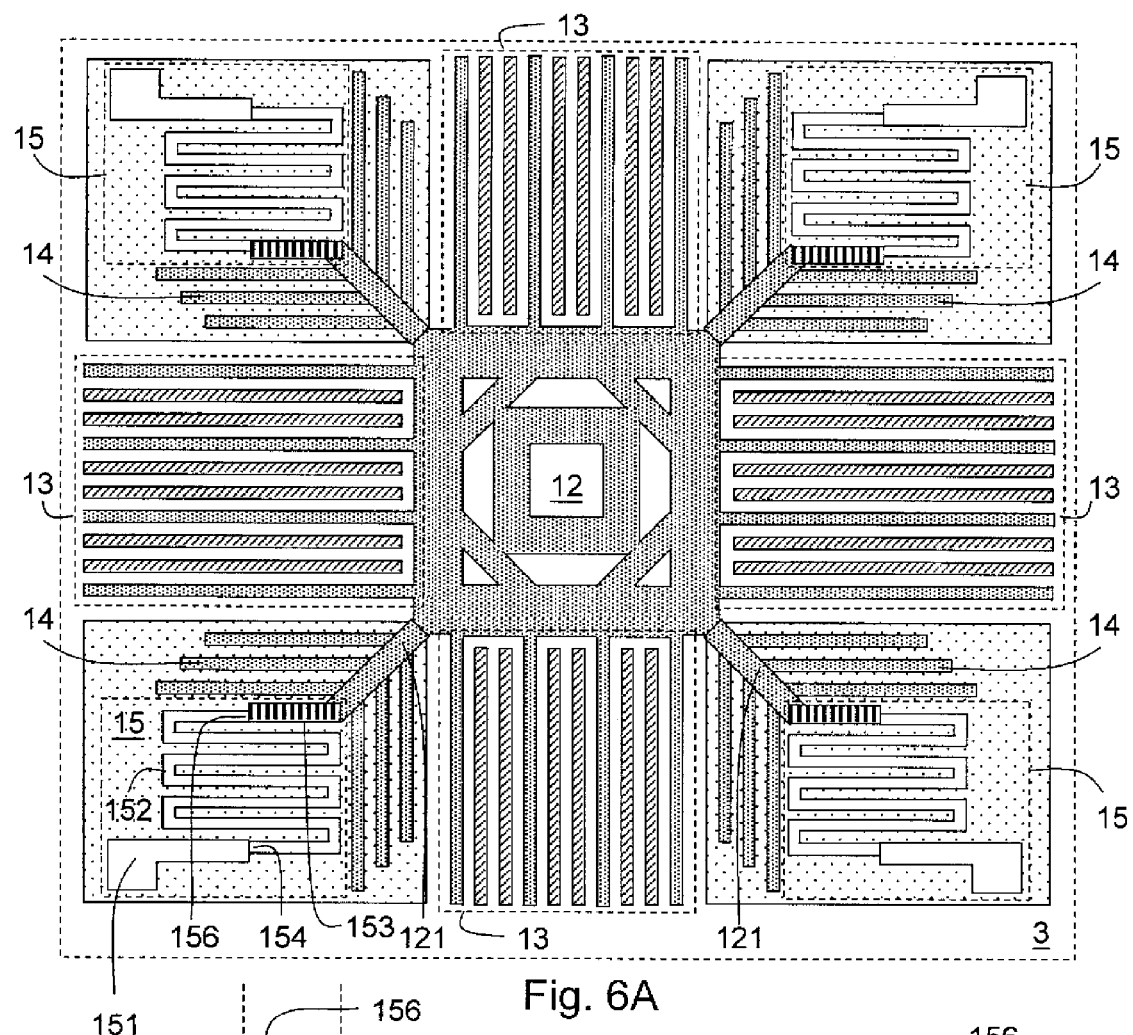
FIGS. 6A-6C show a second embodiment of the present invention.
Figures 6B, 6C:
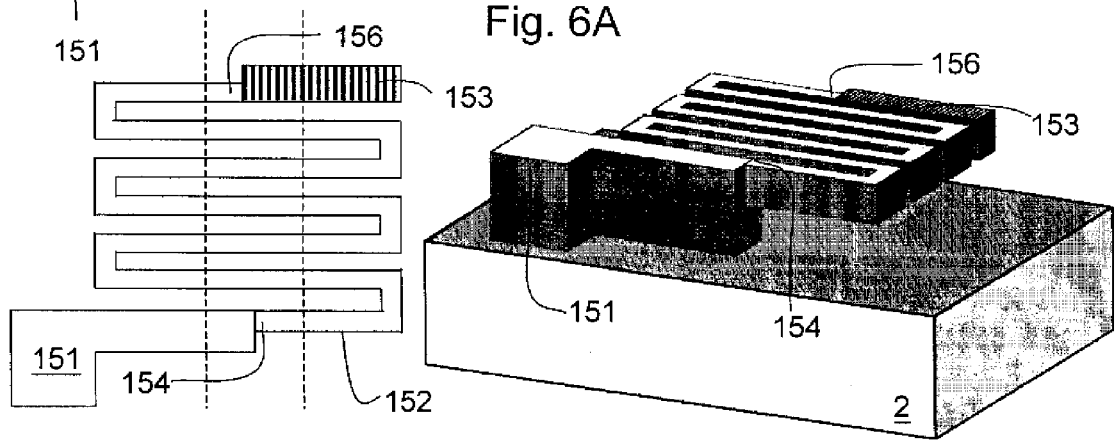

FIGS. 6A-6C show another embodiment of the present invention. This embodiment proposes an improvement in the spring structure of the three dimensional MEMS accelerometer. According to this embodiment, a MEMS accelerometer 3 includes four springs 15; a proof mass 12 having four joints 121 which connect to the four springs 15 respectively; and multiple in-plane sense electrodes 13 and multiple out-of-plane sense electrodes 14, wherein the multiple in-plane sense electrodes 13 and the multiple out-of-plane sense electrodes 14 are the same as the aforementioned embodiment, as referring to FIGS. 4A-4B and 5A-5C. The numbers of the springs 15 and the joints 121 are necessarily four and they can be modified to any other number. In this embodiment, each spring 15 includes a spring anchor 151 which is fixed on the substrate 2; and an extensible part 152 which has a fixed end 154 fixed to the spring anchor 151, and a free end 156 floating above the substrate 2. FIGS. 6B and 6C show one spring 15. The extensible part 152 is folded back and forth to form a substantially polygon shape as a whole, for example but not limited to a square shape. Different from the aforementioned embodiment, the fixed end 154 is not located at or near a corner of the substantially polygon shape, but is distant from the corner; it is located within, for example, the middle one third length of one side of the substantially polygon shape, as indicated by a region between two dash lines in FIG. 6B. The free end 156 of the spring 15 may directly connect to the proof mass 12 (for example to the joint 121 which extends longer than the aforementioned embodiment), or as shown in the figure, the spring 15 may further include a wider stabilizing sector 153, for connecting the free end 156 with the proof mass 12. The stabilizing sector 153 is located at the same side with the free end 156, and the stabilizing sector 153 has a width which is wider than the width of the free end 156.

Figure 7A:
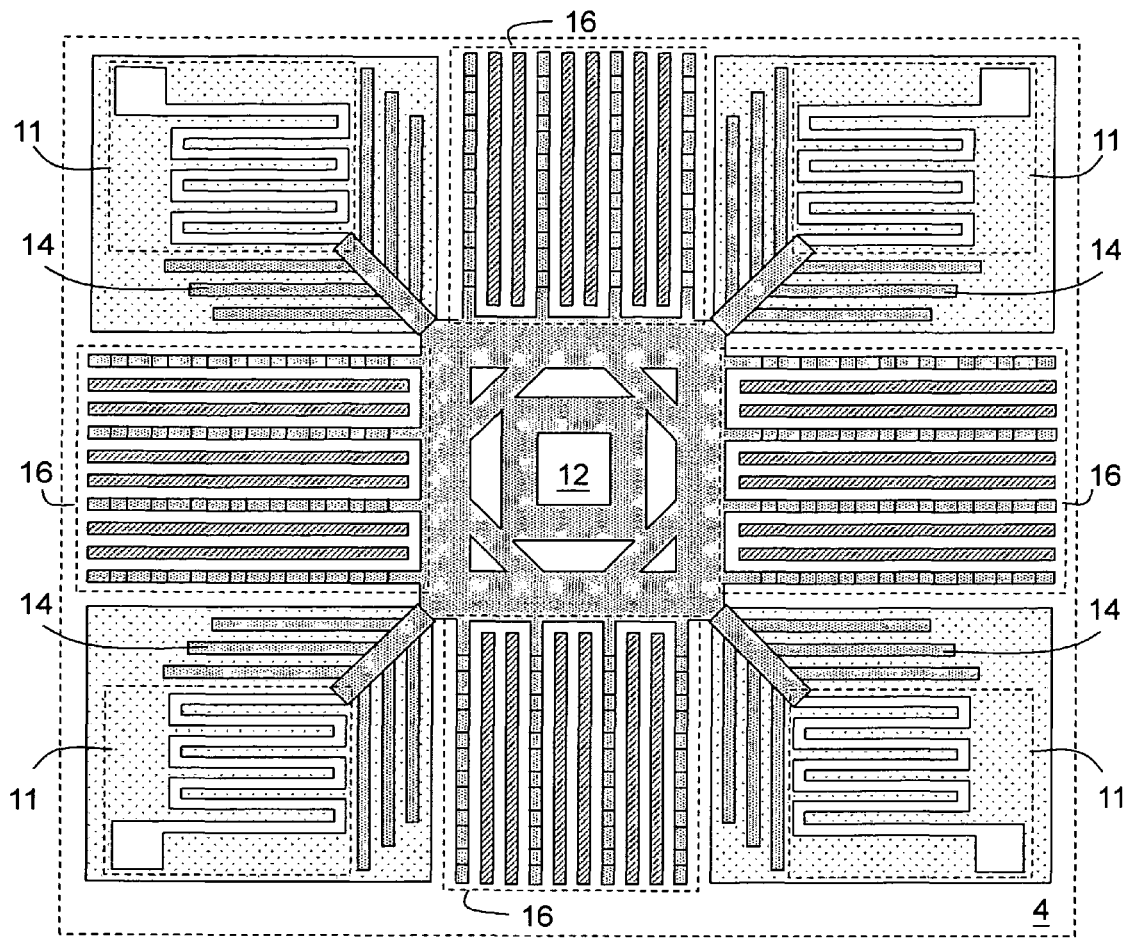
FIGS. 7A-7C show a third embodiment of the present invention.
Figure 7B:
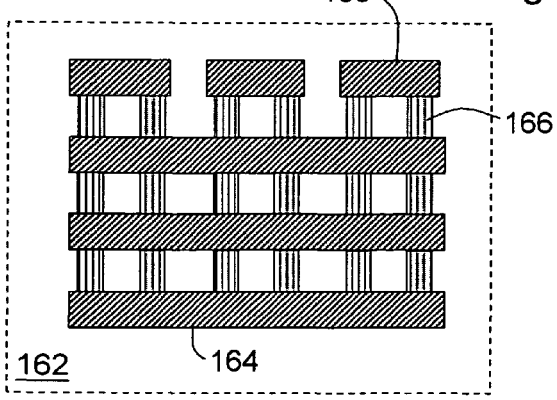
Figure 7C:
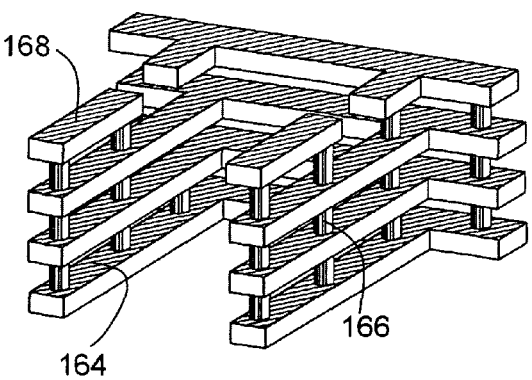

In addition to the improvement in the spring structure, the present invention also proposes to reduce the continuous length of the top and/or bottom layer in the structure, to alleviate the impact of stress to the structure. FIGS. 7A-7C show the third embodiment of the present invention. The difference between the MEMS accelerometer 4 in this embodiment and the MEMS accelerometer 1 in the first embodiment is that, in the in-plane sense electrode 16 of this embodiment, the top rotor metal layer 168 of a rotor 162 is divided into multiple metal sectors as shown in FIGS. 7B-7C. The multiple metal sectors are connected to an adjacent rotor metal layer by multiple rotor connection plugs 166, and the metal layer is further connected to a next lower layer, till a bottom rotor metal layer 164. The purpose of this design to divide the top rotor metal layer 168 into multiple metal sectors is to reduce the continuous length of the top rotor metal layer 168, such that the impact of stress to the rotor structure can be reduced. The spring 11 shown in this embodiment is the same as the one of the first embodiment, but it certainly can be replaced by the spring 15 of the second embodiment instead.

Figure 8A:
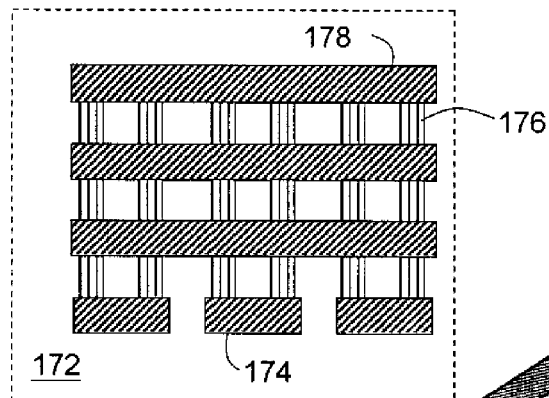
FIGS. 8A-8B show a fourth embodiment of the present invention.
Figure 8B:
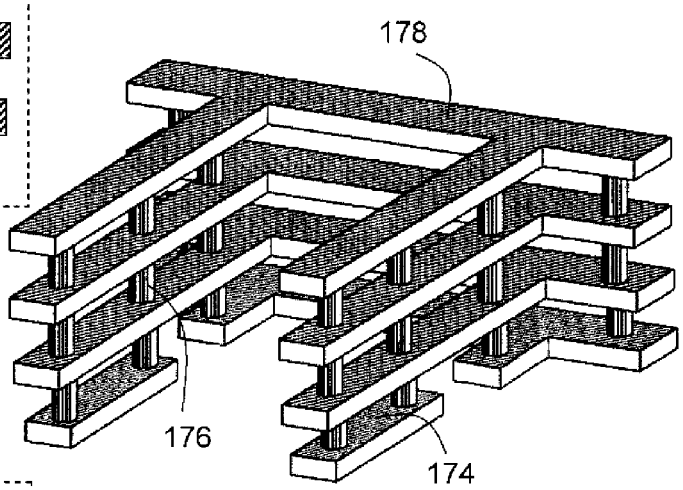

FIGS. 8A-8B show the fourth embodiment of the present invention. This embodiment illustrates another example of the in-plane sense electrode 17. The in-plane sense electrode 17 includes a rotor 172 which has a bottom rotor metal layer 174 divided into multiple metal sectors. As shown in FIG. 8B, these metal sectors are connected to an adjacent rotor metal layer by multiple rotor connection plugs 176, and the metal layer is further connected to a next layer, till a top rotor metal layer 178.

Figure 9A:
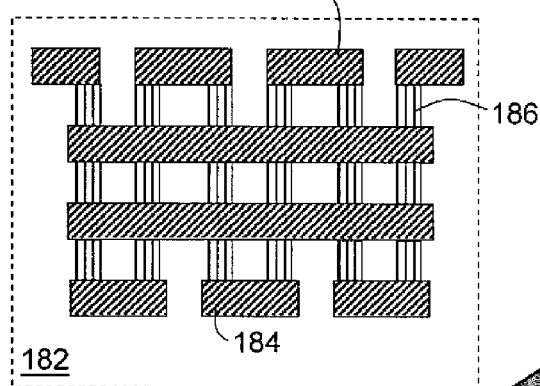
FIGS. 9A-9B show a fifth embodiment of the present invention.
Figure 9B:
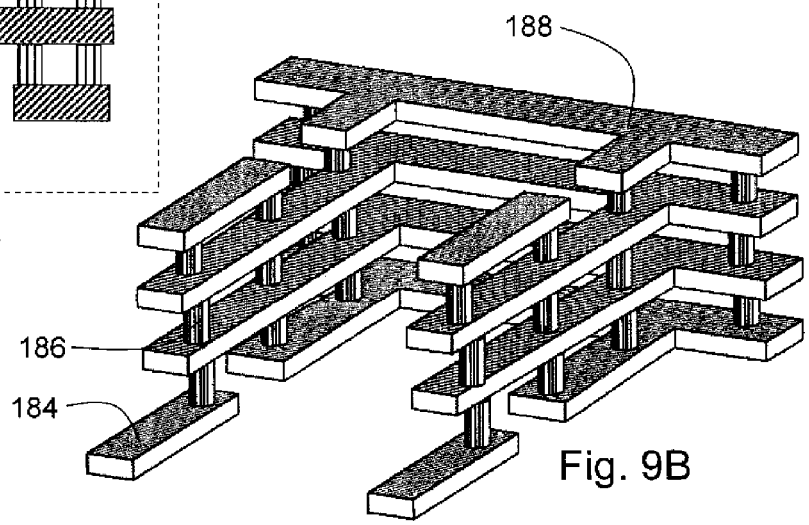

FIGS. 9A-9B show the fifth embodiment of the present invention. This embodiment illustrates another example of the in-plane sense electrode 18. The in-plane sense electrode 18 includes a rotor 182 which has a top rotor metal layer 188 and a bottom rotor metal layer 184. Both the top rotor metal layer 188 and the bottom rotor metal layer 184 are divided into multiple metal sectors. As shown in FIG. 9B, these metal sectors are connected to adjacent rotor metal layers by multiple rotor connection plugs 186, and the metal layers are connected from the bottom rotor metal layer 184 till the top rotor metal layer 188. The third, fourth, and fifth embodiments illustrate that if the top and/or bottom layer of the rotor structure has a reduced length, the impact of stress to the structure can be reduced.

Figure 10A:
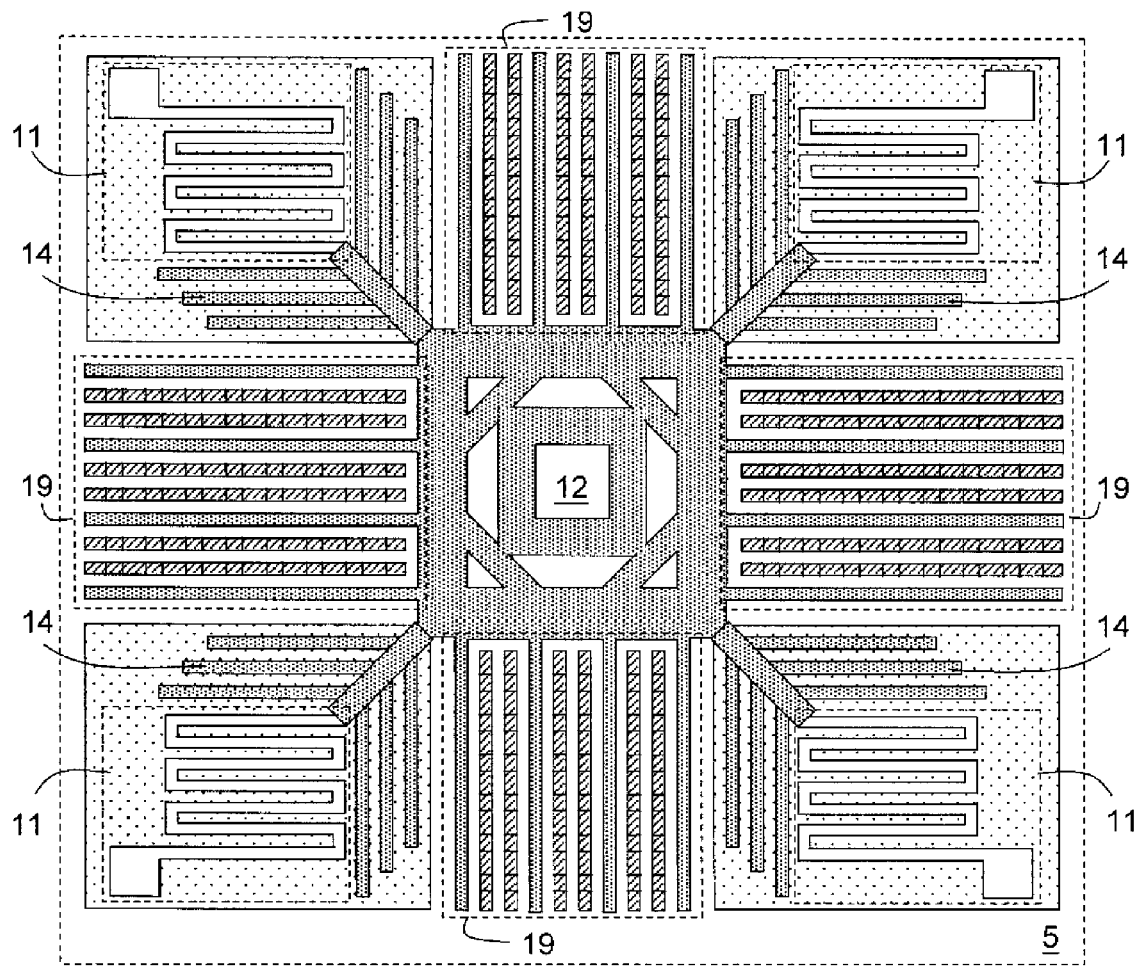
FIGS. 10A-10C show a sixth embodiment of the present invention.
Figure 10B:
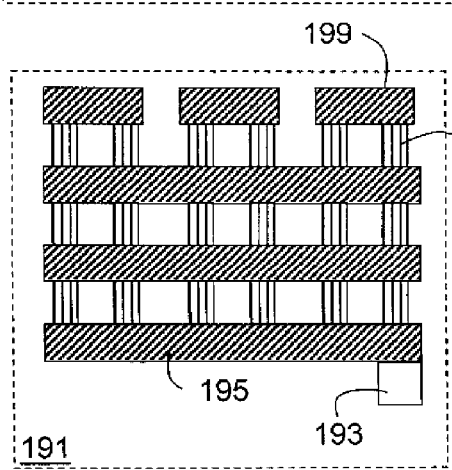
Figure 10C:
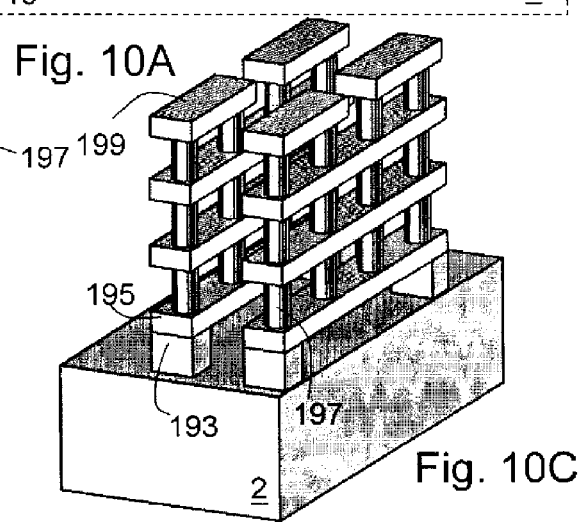

FIGS. 10A-10C show the sixth embodiment of the present invention. The MEMS accelerometer 5 of this embodiment is different from the MEMS accelerometers of the third, fourth, and fifth embodiments in that, this embodiment reduces the continuous length of the top layer of the stator structure. As shown in the figures, the top stator metal layer 199 of each stator 191 in an in-plane sense electrode 19 is divided into multiple metal sectors. As shown in FIGS. 10B and 10C, the multiple metal sectors are connected to an adjacent stator metal layer by multiple stator connection plugs 197, and the metal layer is further connected to a next layer, till a bottom stator metal layer 195; the bottom stator metal layer 195 is fixed on the substrate 2 by a stator anchor 193. As shown in FIG. 10B, each stator 191 has a substantially linear shape from top view, and the number of the stator anchor 193 may be one or plural. When the stator 191 has only one stator anchor 193, the stator anchor 193 is preferably located at an end nearer to the proof mass 12. The spring 11 shown in this embodiment is the same as the one of the first embodiment, but it certainly can be replaced by the spring 15 of the second embodiment instead.

Figures 11A, 11B:
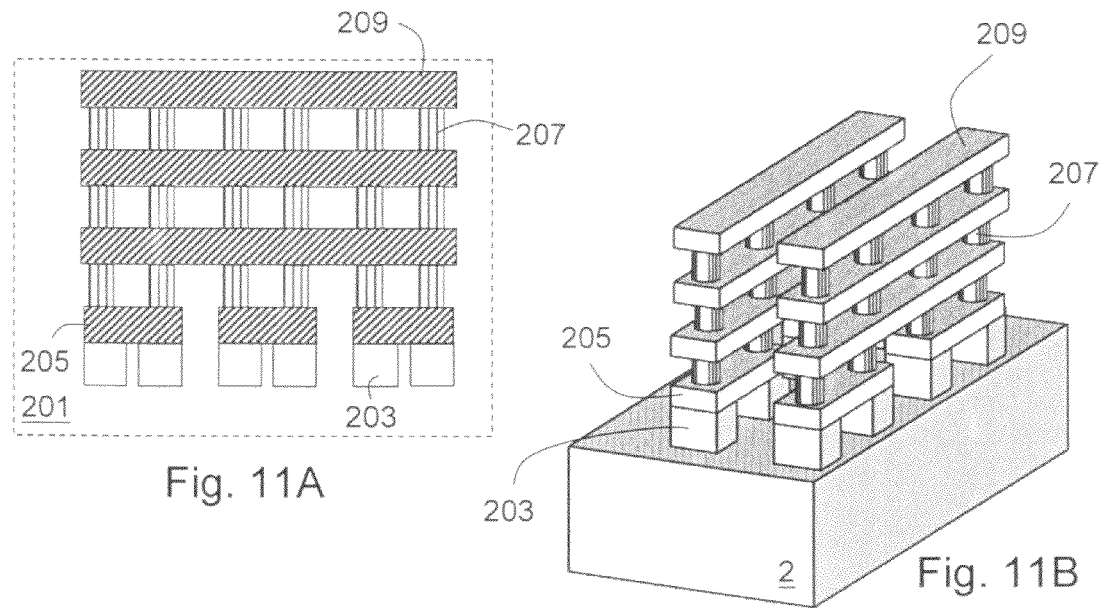
FIGS. 11A-11B show a seventh embodiment of the present invention.

FIGS. 11A-11B show the seventh embodiment of the present invention. This embodiment illustrates another example of the in-plane sense electrode 20. The in-plane sense electrode 20 includes multiple stators 201 which has a bottom stator metal layer 205 divided into multiple metal sectors. As shown in FIG. 11B, these metal sectors are connected to an adjacent stator metal layer by multiple stator connection plugs 207, and the metal layer is further connected to a next layer, till a top stator metal layer 209.

Figures 12A, 12B:
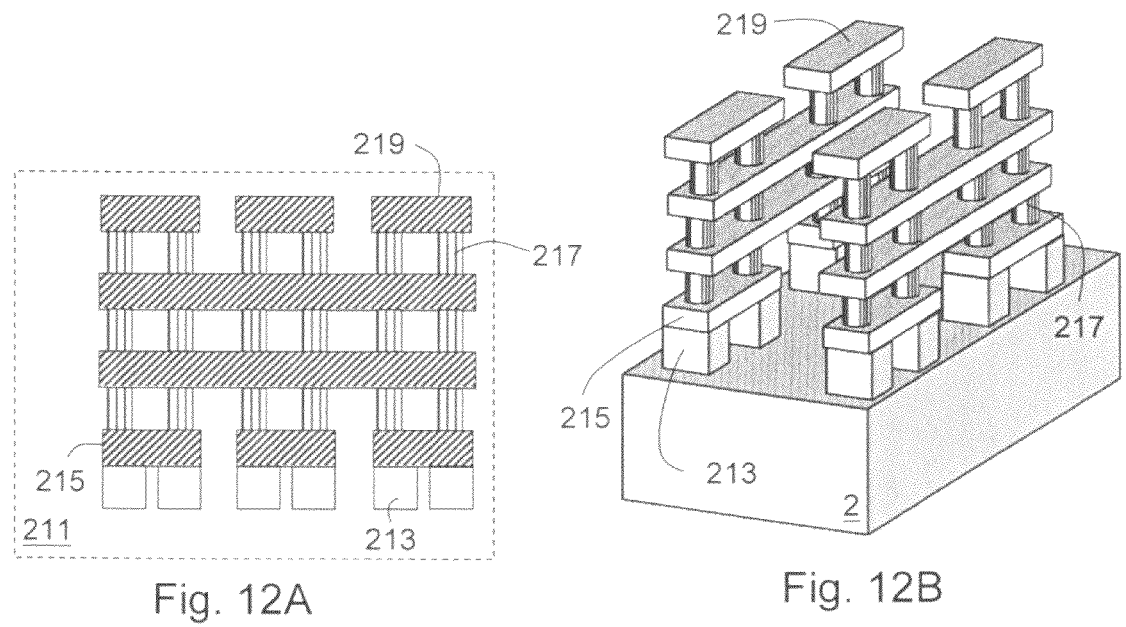
FIGS. 12A-12B show an eighth embodiment of the present invention.

FIGS. 12A-12B show the eighth embodiment of the present invention. This embodiment illustrates another example of the in-plane sense electrode 21. The in-plane sense electrode 21 includes a stator 211 which has a top stator metal layer 219 and a bottom stator metal layer 215. Both the top stator metal layer 219 and the bottom stator metal layer 215 are divided into multiple metal sectors. As shown in FIG. 12B, these metal sectors are connected to adjacent stator metal layers by multiple stator connection plugs 217, and the metal layers are connected from the bottom stator metal layer 215 till the top stator metal layer 219. The sixth, seventh, and eighth embodiments illustrate that if the top and/or bottom layer of the rotor structure has a reduced length, the impact of stress to the structure can be reduced.

Figure 13A:
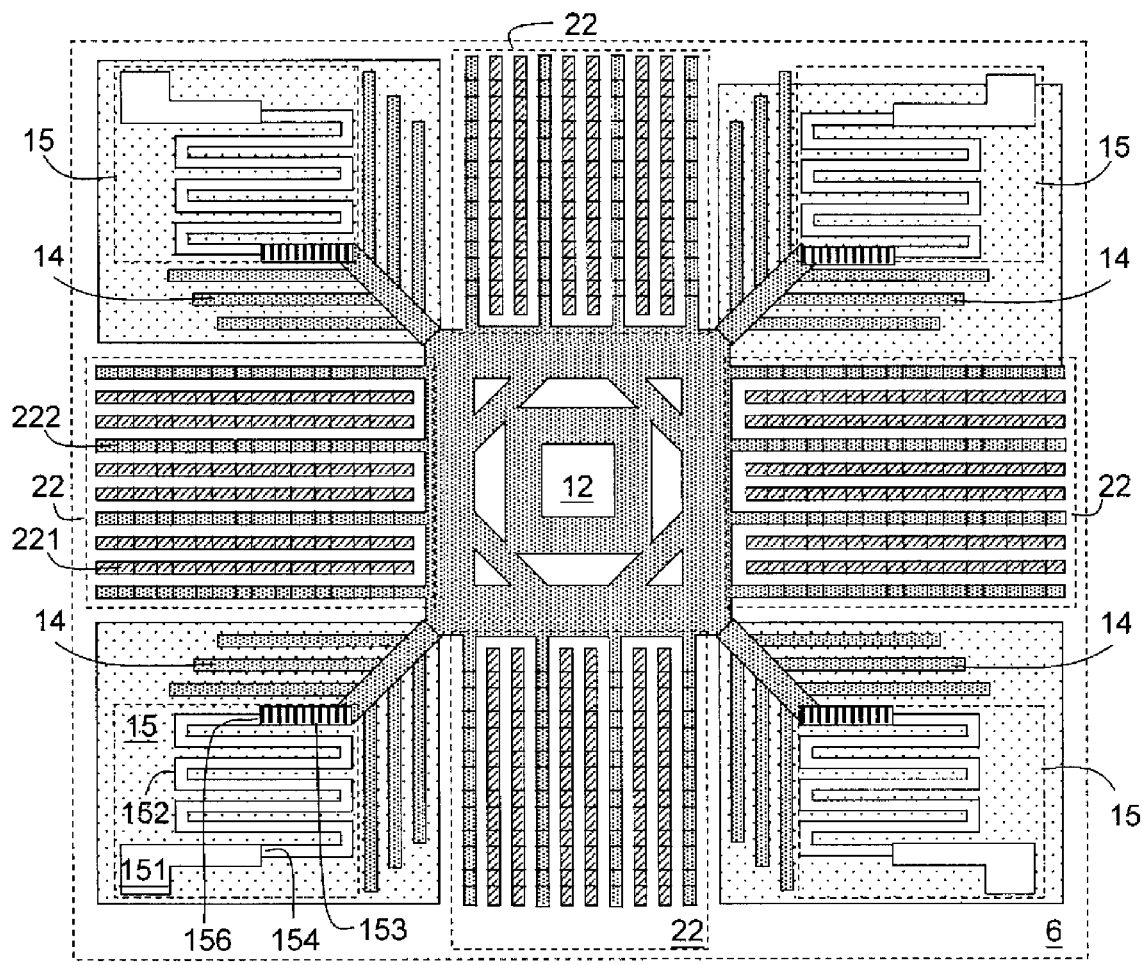
FIGS. 13A-13C show a ninth embodiment of the present invention.
Figure 13B:
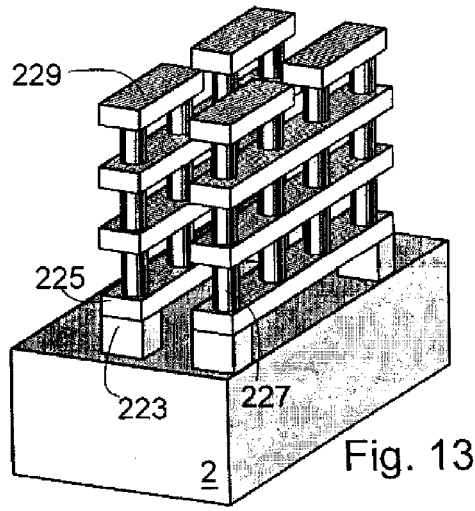
Figure 13C:
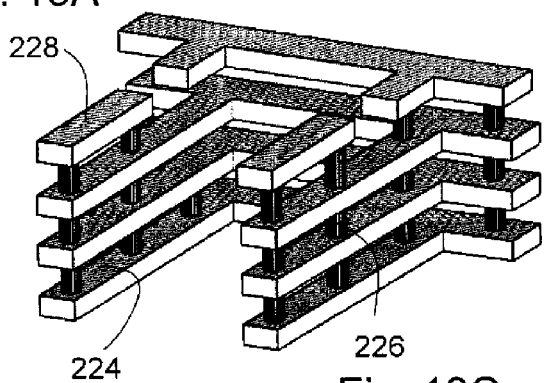

FIGS. 13A-13C show the ninth embodiment of the present invention. The MEMS accelerometer 6 of this embodiment includes an in-plane sense electrode 22 which has a rotor structure and a stator structure. Both the rotor structure and the stator structure include top layers which are divided into multiple metal sectors for reducing the continuous length of the top layers. As shown in FIGS. 13A-13C, the top stator metal layer 229 of each stator 221 is divided into multiple metal sectors. As shown in FIG. 13B, the multiple metal sectors are connected to an adjacent stator metal layer by multiple stator connection plugs 227, and the metal layer is further connected to a next layer, till a bottom stator metal layer 225; the bottom stator metal layer 225 is fixed on the substrate 2 by a stator anchor 223. Besides, the top rotor metal layer 228 of a rotor 222 is divided into multiple metal sectors as shown in FIG. 13C. The multiple metal sectors are connected to an adjacent rotor metal layer by multiple rotor connection plugs 226, and the metal layer is further connected to a next layer, till a bottom rotor metal layer 224. Each stator 221 has a substantially linear shape as shown in FIG. 13B, and the number of the stator anchor 223 may be one or plural. When the stator 221 has only one stator anchor 223, the stator anchor 223 is preferably located at an end nearer to the proof mass 12. The stator 221 of this embodiment may be replaced by the stator 201 shown in FIG. 11B or the stator 211 shown in FIG. 12B. The rotor 222 of this embodiment may be replaced by the rotor 172 shown in FIG. 8B or the rotor 182 shown in FIG. 9B. And the spring 15 of this embodiment may be replaced by the spring 11.

Figure 14A:
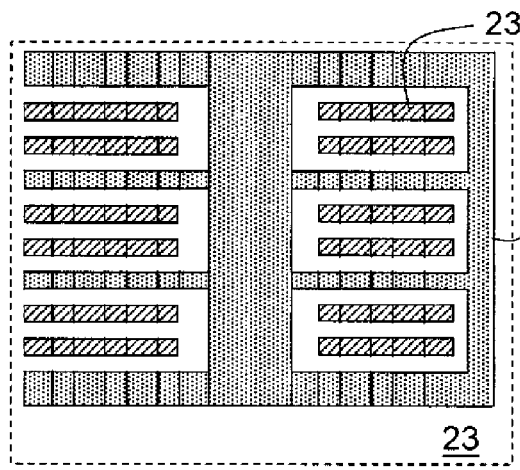
FIGS. 14A-14B show a tenth embodiment of the present invention.
Figure 14B:
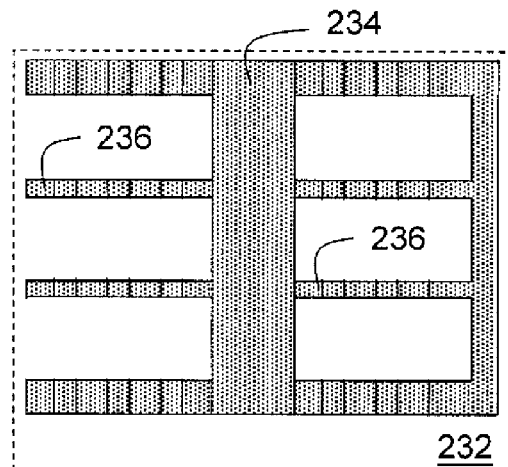

FIGS. 14A-14B show the tenth embodiment of the present invention. This embodiment illustrates another example of the in-plane sense electrode 23. The in-plane sense electrode 23 includes multiple stators 231 and a rotor 232. This embodiment has a feature that the rotor 232 structure is strengthened. As shown in FIG. 14B, the rotor 232 includes a relatively wider enhancement beam 234 in addition to a relatively narrower electrode 236, for enhancing the structural strength of the rotor 232. The enhancement beam 234 of the rotor 232 includes an "I" shape from top view as shown in FIG. 14B. The cross-sectional structure of the stator 231 and the rotor 232 may be any structure of the third to the ninth embodiments. For example, the top stator metal layer of the stator 231 and/or the bottom stator metal layer may include multiple metal sectors which are connected to an adjacent stator metal layer by at least one stator connection plug. Besides, the top rotor metal layer of the rotor 232 and/or the bottom rotor metal layer may also include multiple metal sectors which are connected to an adjacent rotor metal layer by at least one rotor connection plug.

Figure 15A:
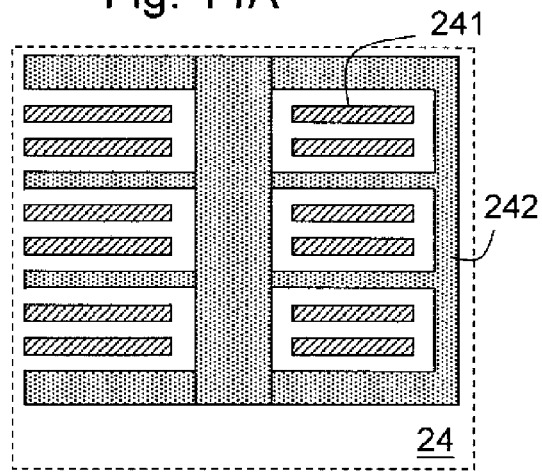
FIGS. 15A-15B show an eleventh embodiment of the present invention.
Figure 15B:
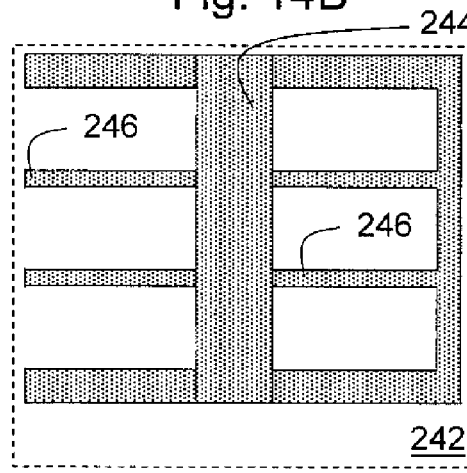

FIGS. 15A-15B show the eleventh embodiment of the present invention. This embodiment illustrates another example of the in-plane sense electrode 24. The in-plane sense electrode 24 includes multiple stators 241 and a rotor 242. As shown in FIG. 15B, the rotor 242 includes a relatively wider enhancement beam 244 and a relatively narrower electrode 246, for enhancing the structural strength of the rotor 242. And the enhancement beam 244 of the rotor 242 includes an "I" shape from top view as shown in FIG. 15B. Different from the previous embodiment, the top stator metal layer and the bottom stator metal layer of the stator 231 are both single continuous metal sectors, connected to an adjacent rotor metal layer by at least one rotor connection plug.

Figure 16A:
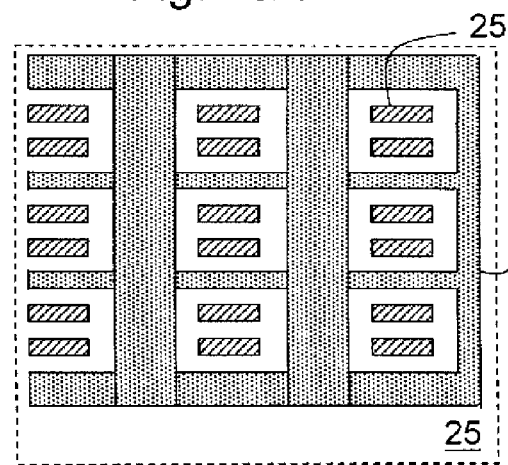
FIGS. 16A-16B show a twelfth embodiment of the present invention.
Figure 16B:
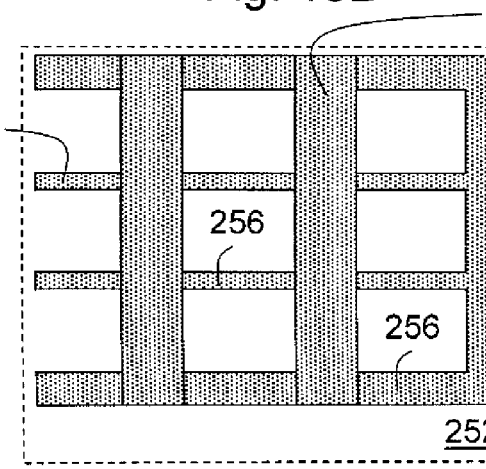

FIGS. 16A-16B show the twelfth embodiment of the present invention. This embodiment illustrates another example of the in-plane sense electrode 25. The in-plane sense electrode 25 includes multiple stators 251 and a rotor 252. As shown in FIG. 16B, the rotor 252 includes a relatively wider enhancement beam 254 and a relatively narrower electrode 256, for enhancing the structural strength of the rotor 252. The enhancement beam 254 of the rotor 252 includes an "II" shape from top view as shown in FIG. 16B.

Figures 17A, 17B:
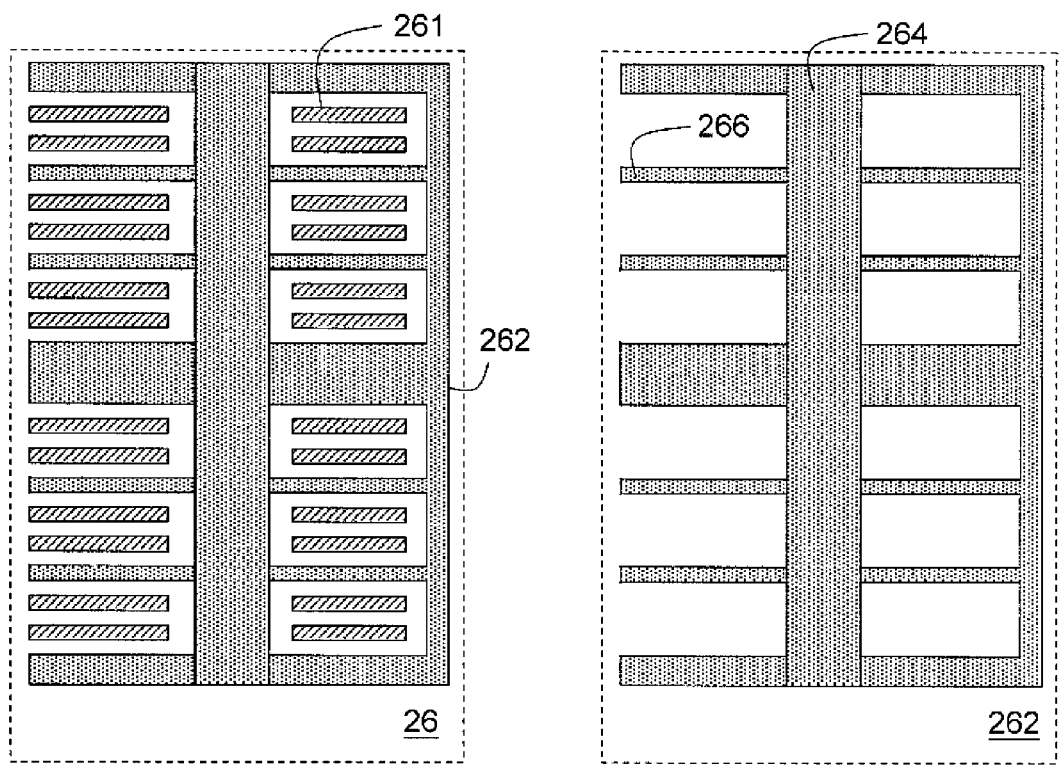
FIGS. 17A-17B show a thirteenth embodiment of the present invention.

FIGS. 17A-17B show the thirteenth embodiment of the present invention. This embodiment illustrates another example of the in-plane sense electrode 26. The in-plane sense electrode 26 includes multiple stators 261 and a rotor 262. As shown in FIG. 17B, the rotor 262 includes a relatively wider enhancement beam 264 and a relatively narrower electrode 266, for enhancing the structural strength of the rotor 262. And the enhancement beam 264 of the rotor 262 includes a cross shape from top view as shown in FIG. 17B.

In the aforementioned tenth to thirteenth embodiments, the structure of the stator can be enhanced by the enhancement beam in various forms. The "I" shape, the "II" shape, and the cross shape are only examples.

Figure 18A:
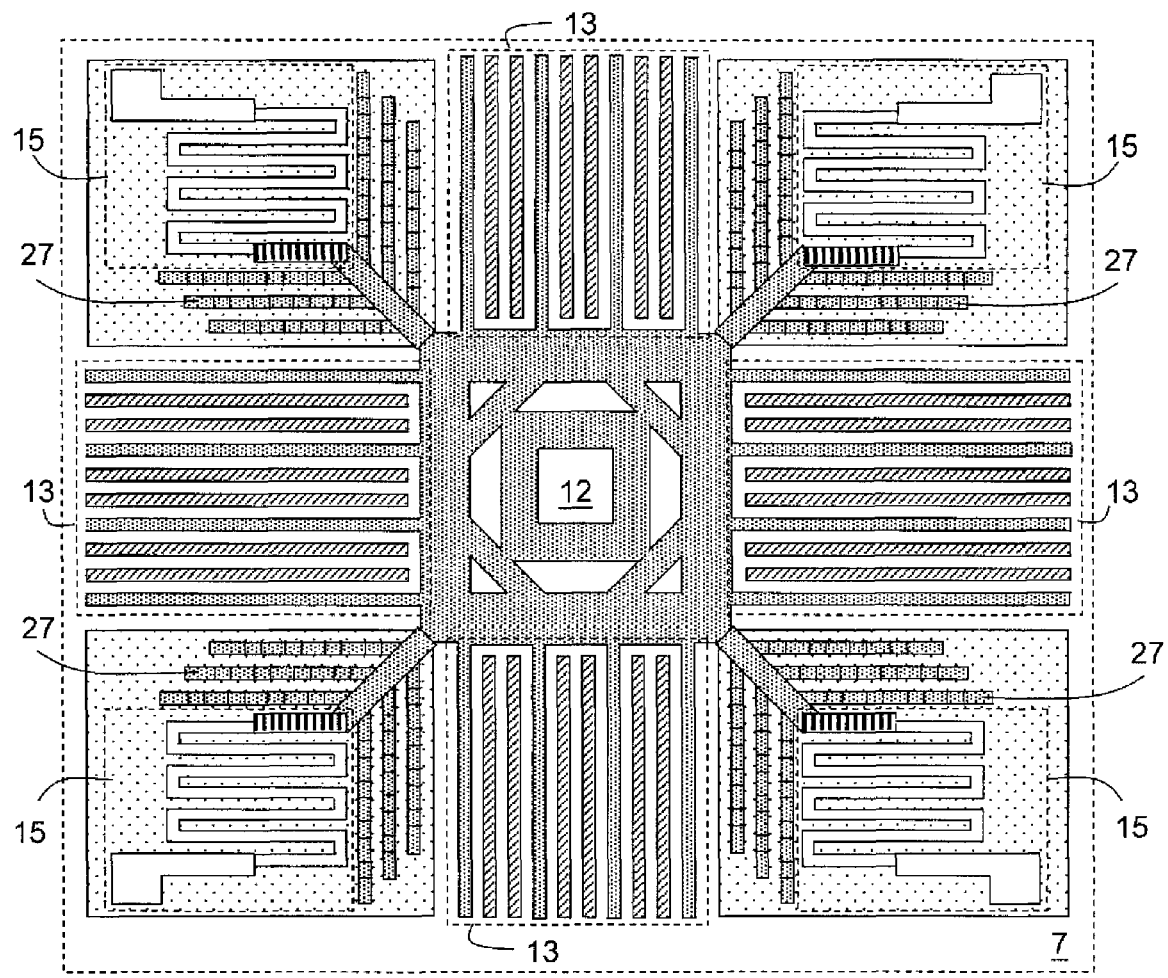
FIGS. 18A-18C show a fourteenth embodiment of the present invention.
Figure 18B:
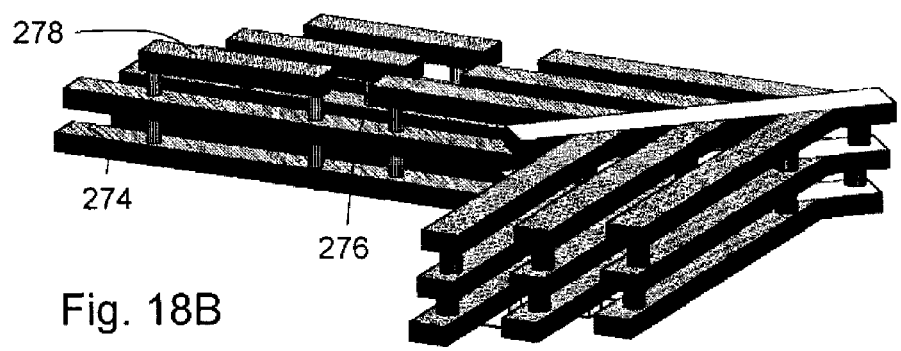
Figure 18C:
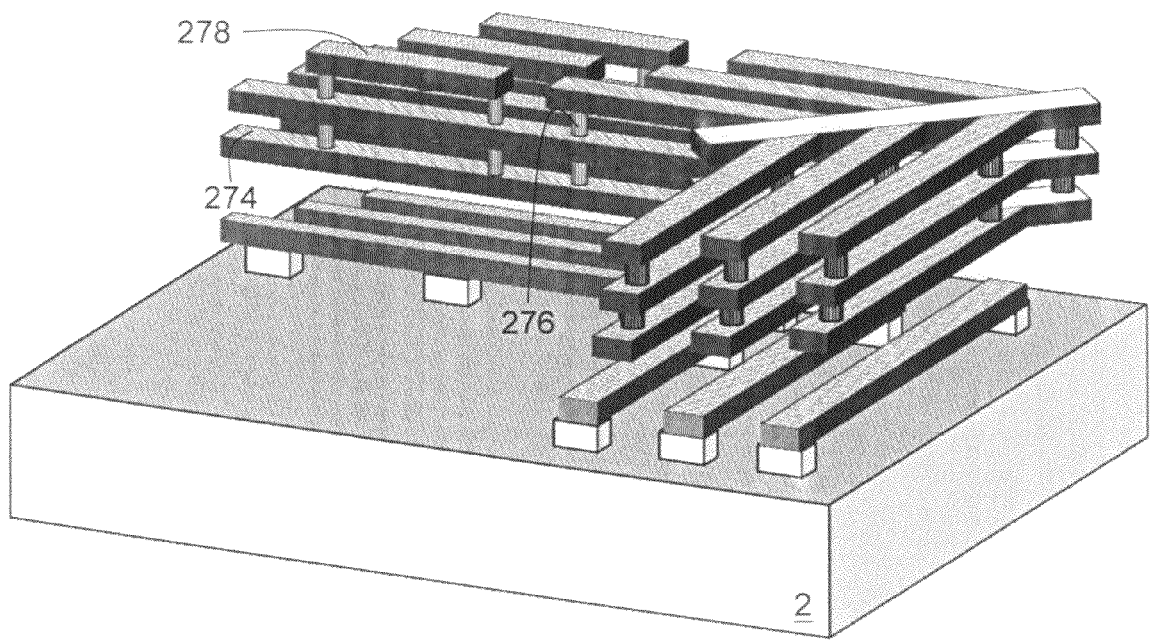

FIGS. 18A-18C show the fourteenth embodiment of the present invention. The difference between the MEMS accelerometer 7 of this embodiment and the MEMS accelerometer 1 of the first embodiment is that, in the out-of-plane sense electrode 16 of this embodiment, the top z-axis rotor metal layer 278 of a z-axis rotor 27 is divided into multiple metal sectors as shown in FIGS. 18A-18C. As shown in FIG. 18B, the multiple metal sectors are connected to an adjacent z-axis rotor metal layer by multiple z-axis rotor connection plugs 276, and the metal layer is further connected to a next layer, till a bottom z-axis rotor metal layer 274. The spring 11 of this embodiment may be replaced by the spring 15, and the in-plane sense electrode 13 may be replaced by the in-plane sense electrodes 16, 17, 18, 19, 20, 21, 22, 23, 24, 25, or 26.

Figure 19:
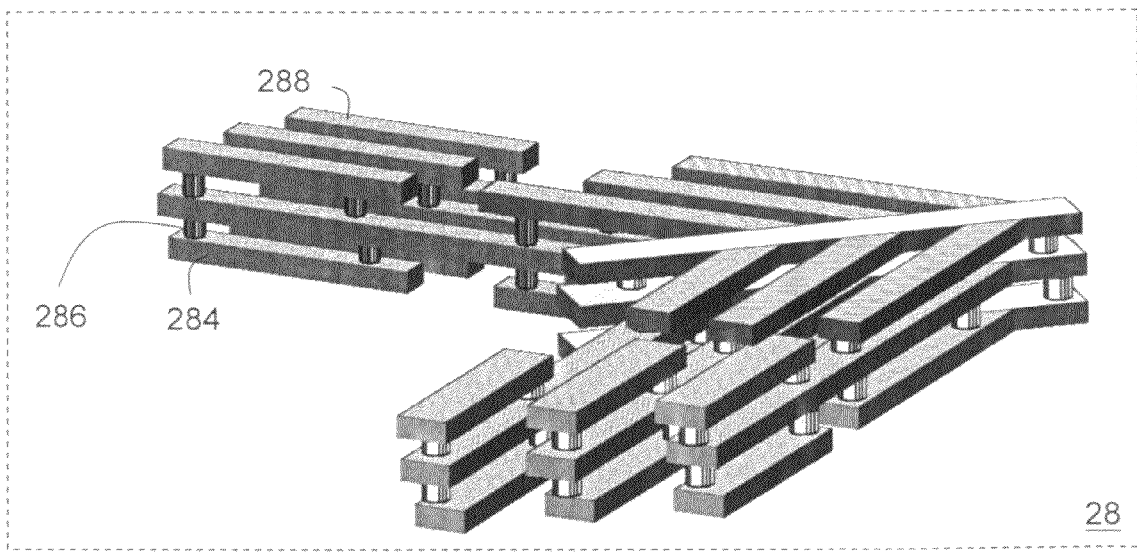
FIG. 19 shows a fifteenth embodiment of the present invention.

FIG. 19 shows the fifteenth embodiment of the present invention. This embodiment illustrates another example of the z-axis rotor 28 of the out-of-plane sense electrode. The z-axis rotor 28 has a top z-axis rotor metal layer 288 and a bottom z-axis rotor metal layer 284. Both the top z-axis rotor metal layer 288 and the bottom z-axis rotor metal layer 284 are divided into multiple metal sectors. As shown in FIG. 19, these metal sectors are connected to adjacent z-axis rotor metal layers by multiple z-axis rotor connection plugs 286, and the metal layers are connected from the bottom z-axis rotor metal layer 284 to the top z-axis rotor metal layer 288. The fourteenth and the fifteenth embodiments illustrate that if the top and/or bottom layer of a z-axis rotor has a reduced length, the impact of stress to the structure can be reduced.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the number of metal layers of the present invention can be any suitable number, not limited to four. For another example, the connection plug is not limited to a cylindrical shape or a cubic column shape, and it may be an extended elliptical shape. For another example, the spring also may be formed by multiple metal layers. For another example, the locations of the in-plane sense electrode 13 and the out-of-plane sense electrode 14 can be interchanged. For another example, the springs may be located on the four sides instead of the four corners of the mass. For another example, the shapes of the structural parts can be modified, and they are not limited to the shapes shown in the embodiments; for example the proof mass 12 is not limited to a square shape. In view of the foregoing, the spirit of the present invention should cover all such and other modifications and variations, which should be interpreted to fall within the scope of the following claims and their equivalents.

What is claimed is:

1. A MEMS accelerometer with enhanced structural strength, comprising:
   multiple springs wherein each spring includes:
      a spring anchor fixed on a substrate; and
      an extensible part having:
         a fixed end fixed to the spring anchor; and
         a free end floating above the substrate;
         wherein the extensible part is folded back and forth to form a substantially polygon shape as a whole, in which the fixed end is not located around a corner of the substantially polygon shape, and the free end is located within an opposite side of the substantially polygon shape and neither around a corner;
   a proof mass having multiple joints connected to corresponding free ends of the multiple springs respectively; and
   multiple in-plane sense electrodes wherein each in-plane sense electrode includes:
      at least one stator fixed on the substrate, having:
         a stator anchor fixed on the substrate;
         multiple stator metal layers fixed to the stator anchor; and
         at least one stator connection plug for connecting adjacent layers of the stator metal layers; and
      at least one rotor connected to the proof mass, having:
         multiple rotor metal layers connected to the proof mass; and
         at least one rotor connection plug for connecting adjacent layers of the rotor metal layers;
      wherein a top one, a bottom one, or both top and bottom ones of the stator metal layers include multiple stator metal sectors which are not connected to one another at the same level but are connected to an adjacent stator metal layer by the at least one stator connection plug, and the multiple stator metal sectors belong to one stator of one in-plane sense electrode, or
      wherein a top one, a bottom one, or both top and bottom ones of the rotor metal layers include rotor multiple metal sectors which are not connected to one another at the same level but are connected to an adjacent rotor metal layer by the at least one rotor connection plug, and the multiple rotor metal sectors belong to one rotor of one in-plane sense electrode.

2. The MEMS accelerometer of claim 1, wherein the fixed end is located within the middle one third length of one side of the substantially polygon shape, and the free end is located within the middle one third length of an opposite side of the substantially polygon shape.

3. The MEMS accelerometer of claim 1, wherein each spring further includes a stabilizing sector connecting the free end to the proof mass, the stabilizing sector being located on the same side with the free end and wider than the free end.

4. The MEMS accelerometer of claim 1, wherein the rotor includes a relatively wider enhancement beam and a relatively narrower electrode, for enhancing the structural strength of the rotor.

5. The MEMS accelerometer of claim 4, wherein the enhancement beam includes an "I" shape, an "II" shape, or a cross shape from top view.

6. The MEMS accelerometer of claim 1, further comprising an out-of-plane sense electrode, wherein the out-of-plane sense electrode includes:
   a Z-axis stator fixed on the substrate; and
   at least one Z-axis rotor connected to the proof mass, and each Z-axis rotor having:
      multiple Z-axis rotor metal layers connected to the proof mass; and
      at least one Z-axis rotor connection plug for connecting adjacent layers of the Z-axis rotor metal layers.

7. The MEMS accelerometer of claim 6, wherein a top one, a bottom one, or both top and bottom ones of the Z-axis rotor metal layers include multiple Z-axis rotor metal sectors which are not connected to one another at the same level but are connected to an adjacent Z-axis rotor metal layer by the at least one Z-axis rotor connection plug, and the multiple Z-axis rotor metal sectors belong to one rotor of one out-of-plane sense electrode.

8. The MEMS accelerometer of claim 6, wherein the Z-axis rotor includes extended metal sectors perpendicular to each other from top view.

9. The MEMS accelerometer of claim 1, wherein the stator has a substantially linear shape from top view, and the stator anchor is located at an end nearer to the proof mass.

10. A MEMS accelerometer with enhanced structural strength, comprising:
    multiple springs wherein each spring includes:
       a spring anchor fixed on a substrate; and
       an extensible part having:
          a fixed end fixed to the spring anchor; and
          a free end floating above the substrate;
    a proof mass having multiple joints connected to corresponding free ends of the multiple springs respectively; and
    multiple in-plane sense electrodes wherein each in-plane sense electrode includes:
       at least one stator fixed on the substrate, having:
          a stator anchor fixed on the substrate;
          multiple stator metal layers fixed to the stator anchor; and
          at least one stator connection plug for connecting adjacent layers of the stator metal layers; and
       at least one rotor connected to the proof mass, having:
          multiple rotor metal layers connected to the proof mass; and
          at least one rotor connection plug for connecting adjacent layers of the rotor metal layers;
       wherein a top one, a bottom one, or both top and bottom ones of the rotor metal layers include multiple rotor metal sectors which are not connected to one another at the same level but are connected to an adjacent rotor metal layer by the at least one rotor connection plug, and the multiple rotor metal sectors belong to one rotor of one in-plane sense electrode.

11. The MEMS accelerometer of claim 10, wherein a top one, a bottom one, or both top and bottom ones of the stator metal layers include multiple stator metal sectors which are not connected to one another at the same level but are connected to an adjacent stator metal layer by the at least one stator connection plug, and the multiple stator metal sectors belong to one stator of one in-plane sense electrode.

12. The MEMS accelerometer of claim 10, wherein the rotor includes a relatively wider enhancement beam and a relatively narrower electrode, for enhancing the structural strength of the rotor.

13. The MEMS accelerometer of claim 12, wherein the enhancement beam includes an "I" shape, an "II" shape, or a cross shape from top view.

14. The MEMS accelerometer of claim 10, further comprising an out-of-plane sense electrode, wherein the out-of-plane sense electrode includes:
   a Z-axis stator fixed on the substrate; and
   at least one Z-axis rotor connected to the proof mass, and each Z-axis rotor having:
      multiple Z-axis rotor metal layers connected to the proof mass; and
      at least one Z-axis rotor connection plug for connecting adjacent layers of the Z-axis rotor metal layers.

15. The HEMS accelerometer of claim 14, wherein a top one, a bottom one, or both top and bottom ones of the Z-axis rotor metal layers include multiple Z-axis rotor metal sectors which are not connected to one another at the same level but are connected to an adjacent Z-axis rotor metal layer by the at least one Z-axis rotor connection plug, and the multiple Z-axis rotor metal sectors belong to one rotor of one out-of-plane sense electrode.

16. The MEMS accelerometer of claim 14, wherein the Z-axis rotor includes extended metal sectors perpendicular to each other from top view.

17. The MEMS accelerometer of claim 10, wherein the stator has a substantially linear shape from top view, and the stator anchor is located at an end nearer to the proof mass.

18. A HEMS accelerometer with enhanced structural strength, comprising:
   multiple springs wherein each spring includes:
      a spring anchor fixed on a substrate; and
      an extensible part having:
         a fixed end fixed to the spring anchor; and
         a free end floating above the substrate;
   a proof mass having multiple joints connected to corresponding free ends of the multiple springs respectively; and
   multiple in-plane sense electrodes wherein each in-plane sense electrode includes:
   at least one stator fixed on the substrate, having:
      an stator anchor fixed on the substrate;
      multiple stator metal layers fixed to the stator anchor; and
      at least one stator connection plug for connecting adjacent layers of the stator metal layers; and
   at least one rotor connected to the proof mass, having:
      multiple rotor metal layers connected to the proof mass; and
      at least one rotor connection plug for connecting adjacent layers of the rotor metal layers;
   wherein a top one, a bottom one, or both top and bottom ones of the stator metal layers include multiple stator metal sectors which are not connected to one another at the same level but are connected to an adjacent stator metal layer by the at least one stator connection plug, and the multiple stator metal sectors belong to one stator of one in-plane sense electrode.

19. The MEMS accelerometer of claim 18, wherein the rotor includes a relatively wider enhancement beam and a relatively narrower electrode, for enhancing the structural strength of the rotor.

20. The MEMS accelerometer of claim 19, wherein the enhancement beam includes an "1" shape, an "II" shape, or a cross shape from top view.

21. The MEMS accelerometer of claim 18, further comprising an out-of-plane sense electrode, wherein the out-of-plane sense electrode includes:
   a Z-axis stator fixed on the substrate; and
   at least one Z-axis rotor connected to the proof mass, and each Z-axis rotor having:
      multiple Z-axis rotor metal layers connected to the proof mass; and
      at least one Z-axis rotor connection plug for connecting adjacent layers of the Z-axis rotor metal layers.

22. The MEMS accelerometer of claim 21, wherein a top one, a bottom one, or both top and bottom ones of the Z-axis rotor metal layers include multiple Z-axis rotor metal sectors which are not connected to one another at the same level but are connected to an adjacent Z-axis rotor metal layer by the at least one Z-axis rotor connection plug, and the multiple Z-axis rotor metal sectors belong to one rotor of one out-of-plane sense electrode.

23. The MEMS accelerometer of claim 21, wherein the Z-axis rotor, includes extended metal sectors perpendicular to each other from top view.

24. The MEMS accelerometer of claim 18, wherein the stator has a substantially linear shape from top view, and the stator anchor is located at an end nearer to the proof mass.

* * * * *